United States Patent [19]

Chamberlain et al.

[11] Patent Number: 4,784,364

[45] Date of Patent: Nov. 15, 1988

[54] HEAT-BARRIER CHOCK AND SOLE PLATE SYSTEM

[75] Inventors: Larry W. Chamberlain, Eolia; George W. Rives, Clarksville, both of Mo.

[73] Assignee: Arrow Support Systems Corp., Eolia, Mo.

[21] Appl. No.: 97,734

[22] Filed: Sep. 17, 1987

[51] Int. Cl.$^4$ .............................................. F16M 5/00
[52] U.S. Cl. ................................... 248/673; 248/678; 248/649; 52/126.5
[58] Field of Search ................ 248/673, 678, DIG. 1, 248/676, 680, 188.2, 188.4, 649, 650, 679, 638; 52/DIG. 4, 167, 573, 126.5

[56] References Cited

U.S. PATENT DOCUMENTS

| | | | |
|---|---|---|---|
| 1,893,699 | 1/1933 | Dunning | 248/678 X |
| 2,779,559 | 1/1957 | Bertuch | 248/638 X |
| 3,066,449 | 12/1962 | Cramer, Jr. | 248/678 X |
| 3,335,987 | 8/1967 | Woolslayer et al. | 248/649 |
| 3,398,491 | 8/1968 | Babcock | 52/573 |
| 3,799,461 | 3/1974 | Skeen et al. | 248/678 X |

FOREIGN PATENT DOCUMENTS

| | | | |
|---|---|---|---|
| 3523868 | 1/1987 | Fed. Rep. of Germany | 248/678 |
| 54805 | 5/1977 | Japan | 248/678 |
| 137634 | 8/1983 | Japan | 248/638 |

Primary Examiner—Ramon S. Britts
Assistant Examiner—Karen J. Chotkowski
Attorney, Agent, or Firm—Jerome A. Gross

[57] ABSTRACT

For supporting heat and vibration producing machinery on grouted foundations, high-strength plastic chock halves, which may be glass-polyester laminates, are used beneath machinery conventional steel sole plates resting on conventional plastic grout. The plastic material is characterized by a greater flexibility and much lesser thermal conductivity than steel, so they serve as barriers to the transmission of heat, while their flexible resiliency protects the foundation from vibrations attendant to operation of the machinery so supported. Leveling steel shims inserted between the chock halves do not impair the uniformity of the flexible resiliency they afford at each support point. Fretting wear of the machinery bed plates appears to be completely eliminated.

6 Claims, 2 Drawing Sheets

HEAT-BARRIER CHOCK AND SOLE PLATE SYSTEM

FIELD OF THE INVENTION

Systems for supporting and leveling large machinery, for example, engines at pipeline compressor stations, which generate heat and operate with substantial vibration.

BACKGROUND OF THE INVENTION

Large pipeline compressor engines and similar machines are conventionally installed and supported on sub-surface epoxy-covered concrete foundations, using leveling support assemblies about each anchor bolt which reaches downward into the foundation. These leveling assemblies conventionally consist of chocks on steel sole plates grouted in place on the epoxy-covered foundation with removable steel chocks interposed between the machine base or bedplate and the sole plates. Both the sole plates and chocks conventionally have a vertical slot, to fit around an anchor bolt securing the machine base to the foundation.

The term "sole plate" designates the basic leveling member which supports a shimmed chock upon which the machine base or bedplate rests at several points of support. Each sole plate is a somewhat elongated steel plate which has at each end a heavy lift bolt. With such machine in position and temporarily supported by screw jacks, each sole plate is positioned with its lift bolt tips rested on small circular plates positioned on a sub-surface epoxy-topped concrete foundation. With chocks (thickened with 0.035 inches of shims) temporarily in place on the sole plates, they are brought up to the machine base by turning the lift bolts. Epoxy grout is then poured onto the foundation beneath the sole plates and up to the level of their upper surfaces. When the grout has hardened the lift bolts are turned to raise their tips slightly.

The load may then be transferred from the screw jacks by screwing the lift bolts upward so that the bolt heads (or spacers placed temporarily on them) rise up against the undersurface of the machine base. After removal of the screw jacks the lift bolts may then be lowered so the load rests on the chocks.

As a final step for achieving precise leveling alignment, the lift bolts at selected support points are again screwed upward so their heads (or spacers) bear upward against the machine base, raising the weight off the chocks. These chocks may then be removed for addition or subtraction of shims. With the chock thickness adjusted, the chocks are replaced and the lift bolts are again lowered. This transfers the machine weight again to the chocks.

Such conventional steel support assemblies have been attended by serious service problems resulting from heat and vibration. Heat from such engines, approximating the oil temperature of 140-160 degrees F., is conducted from the engine frame through the steel chocks and sole plates to the poured-in epoxy grout and the epoxy covering of the concrete foundation. At such temperatures heat impairs the strength of the grout; the sole plates may then break loose from the grout under the vibrations of the engine. Further, when engines are supported on steel chocks or shims, their vibrations may cause the engine support surfaces to wear away by "fretting". Restoration work on such support surfaces, as well as grout restoration, may be extremely expensive.

Some experimental efforts, recently made, substitute both sole plates and chocks made of mat-reinforced plastic material. These efforts did not reach the stage of effective commercialization, because the plastic soleplates were too flexible in bending to withstand the imposed loads when applied or reacted through the lift bolts, either on installation or on subsequent leveling operations. For example to install them in regrouting operations, it was ordinarily necessary to make extensive temporary installations of screw jacks closely spaced under the machine base.

SUMMARY OF THE INVENTION

The purposes of the present invention are, generally, to provide a chock and sole plate support assembly advantageously useful for both original installation and regrouting, but which also serves so well as a heat barrier and vibration cushion as to minimize the need for regrouting. A further purpose is to substantially eliminate the fretting wear on machine bases. These and other purposes will be apparent from this disclosure.

In the present invention, simple steel sole plates are employed; but with them plastic upper and lower chock halves, separated by steel shims, are utilized. Because they are loaded only in compression, they need not have great strength or stiffness in bending; they are made of a strong, dense plastic, such as a glass mat-polyester laminate, characterized by thermal conductivity much less than that of steel, and by a degree of flexibility sufficient to lessen vibrations. The upper and lower chock halves are separated by a chosen number of steel shims, with the lower plastic chock halves resting on the steel sole plates. This construction alternates, beneath the metal machine base, then a plastic upper chock half, steel shims, plastic lower chock half, and steel sole plate resting on the poured plastic grout fill. The alternating construction has a unique heat-baffling effect; the number of shims used affects the height afforded by the plastic chocks, but not their cushioning effect; and the vibrations of the machine base, normally cast iron, do not cause it to wear by fretting since it rests solely on the smooth, upper surface of the upper plastic chock half. Because the thermal conductivity of the chock halves is so low, and they absorb or limit the effects of vibration so substantially, the grouting around and beneath the sole plates is protected from deterioration.

DESCRIPTION OF THE PREFERRED EMBODIMENT

Figure 2:
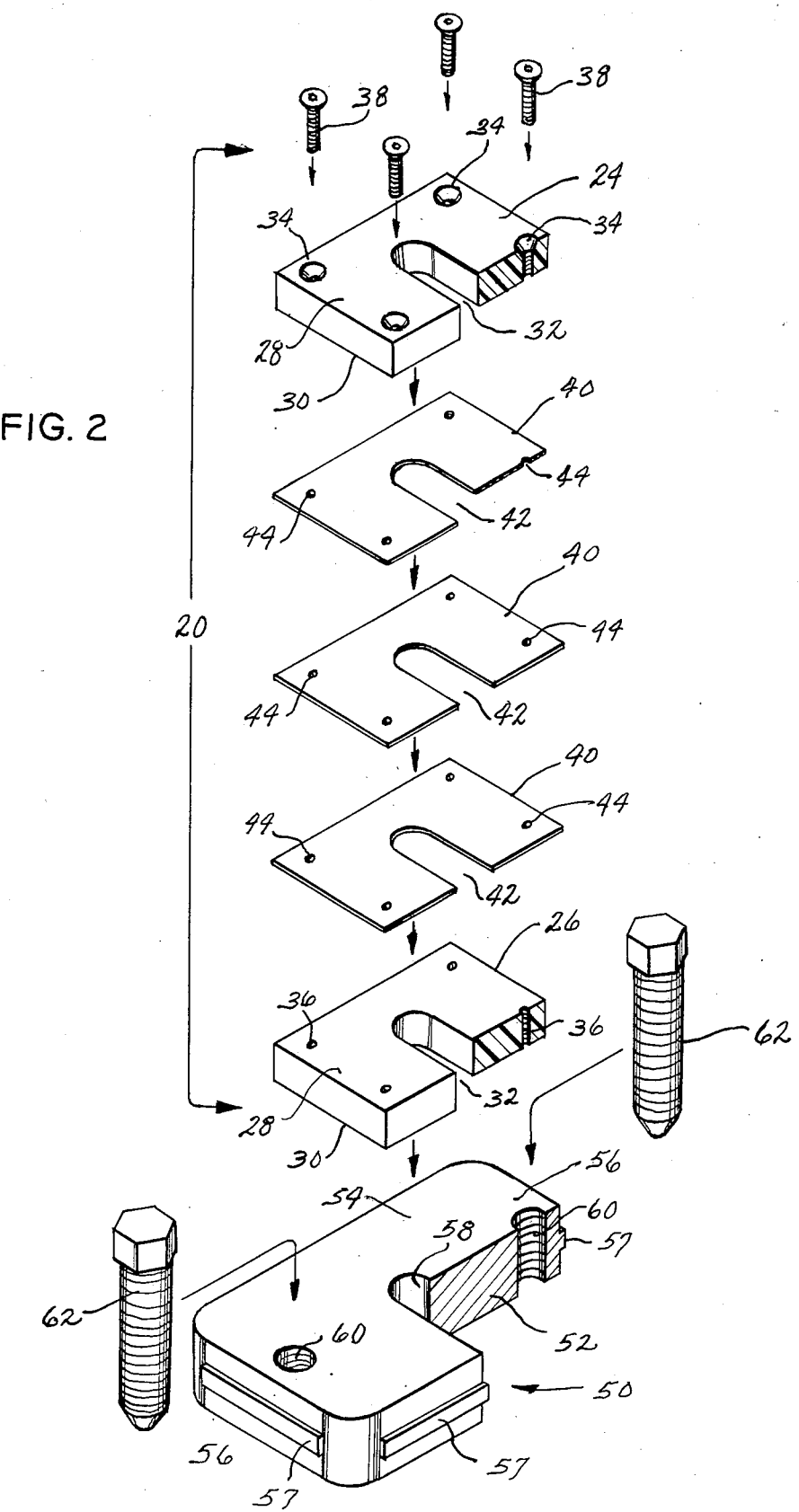
FIG. 2 is an exploded perspective view of the present chock showing slender steel shims to be interposed therein.

The chock assembly of the present invention is generally designated 20 and shown in detail in FIG. 2. In the example illustrated, each chock assembly 20 consists principally of upper and lower chock halves 24, 26 which have a common, substantially rectangular plan form and parallel top and bottom surfaces 28, 30; and are molded from a strong, dense reinforced plastic selected as set forth hereafter.

A slot 32 extends inward from one of the longer side edges of each chock half 24, 26 to accomodate a vertical anchor bolt 74 for attaching the machinery to be supported, as later described. Inward of each corner of the upper chock half 24 is a clearance bore 34, countersunk perpendicular to the top surface 28. The lower chock half 26 has tapped bores 36 registering with the clearance bores 34 of the upper chock half 24. To attach the two halves 24, 26 to each other, countersunk head screws 38 are provided to extend from the clearance bores 34 of the upper half 24 into the tapped bores 36 of the lower chock half 26.

Slender steel shims 40, having a plan form substantially corresponding to that of the chock halves 24, 26 are utilized between the chock halves 24, 26 to increase their effective thickness without changing their total resiliency. Each shim 40 has a slot 42 extending inward from one edge which is in registration with the slot 32 of the chock halves 24, 26. Bores 44, registering with the clearance bores 34 of the upper chock half 24, provide passage for the screws 38 which secure the chock halves 24, 26 to each other.

Figure 1:
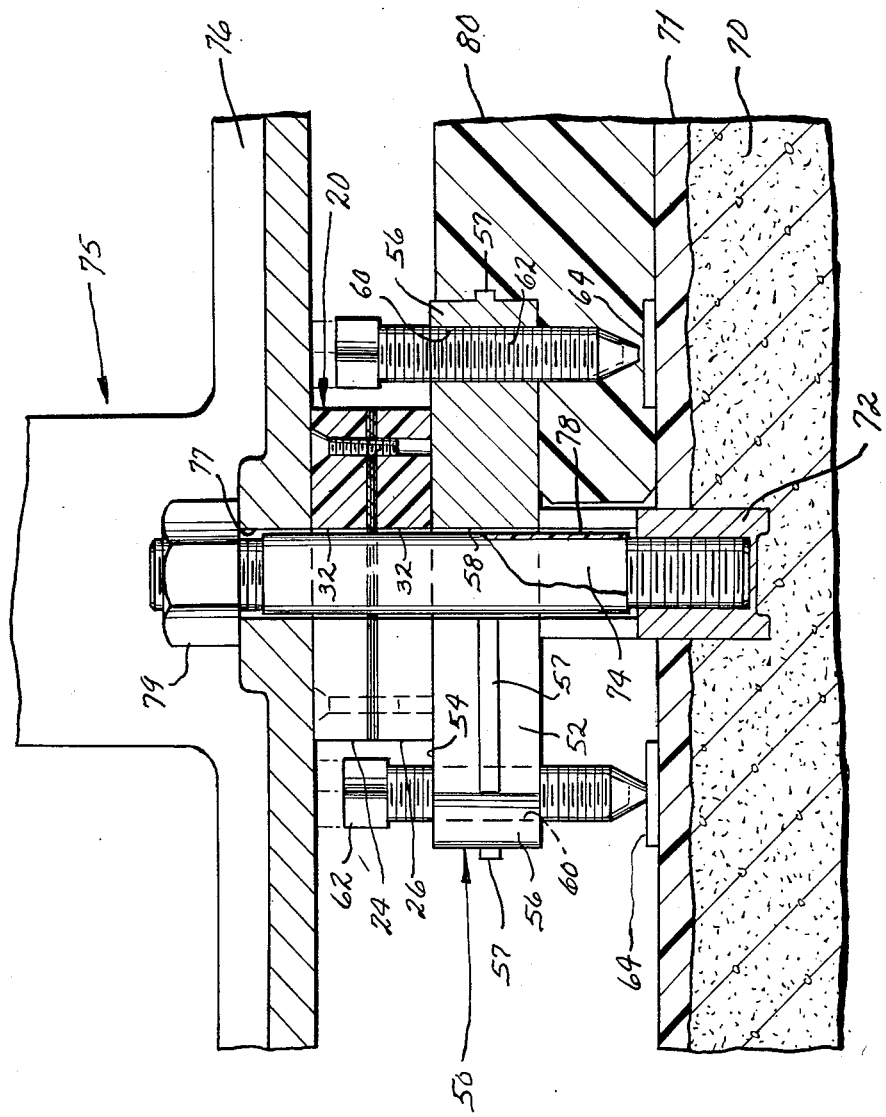
FIG. 1 is a view partly in elevation and partly in section of an installation of the present heat-barrier chock system at one of the points of support of a machine base, shown fragmentarily. The right side is shown in section after grouting. The phantom lines show the position of the lift bolts when raised to bear the weight of the machine.

In a typical application, as illustrated in FIG. 1, the chock 20 is used on top of a steel sole plate 50 at each point of support of a heat and vibration producing machine, generally designated 75 and shown fragmentarily. At each support point is a concrete foundation 70 smoothly topped with a conventional epoxy coating or covering layer 71. For example, at a gas pipeline station, such machine may be the gas-fueled compressor engine. In such applications, in the concrete foundation 70 is conventionally embedded an anchor nut 72 at each support point; into it is threaded an anchor bolt 74, whose opposite end is threaded for bolting down a machine base flange 76. Preferably the bolt 74 extends through a bore 77 in the machine base to receive a nut 79, and is sheathed with a thin heat-resistant plastic tube-like sheath 78 which commences immediately below the machine base 76 and substantially fills the chock slot 32 and the slot in the sole plate hereinafter described.

The steel sole plate 50 conventionally consists of a central portion 52 having a flat upper surface 54; this central portion 52 is flanked by outer portions 56. The central portion 52 has an anchor bolt slot 58 which is in registration with the slot 32 of the chock halves 24, 26. Each spaced-apart outer portion 56 is provided with a bore 60 threaded to receive a heavy lift bolt 62.

To furnish additional surface area for adhesion to the epoxy grout 80 in which the sole plate 50 is to be embedded, external ribs 57, as seen at the left side of FIG. 1 may be provided on its side surfaces; however, grooves would serve this same purpose.

Installation of the system has been previously described, at each support point a sole plate 50 is positioned on the epoxy covering layer 71 on the concrete foundation 70 by resting the previously greased, downward-projecting tips of the lift bolts 62 on steel circular plates 64 placed on the surface of the concrete foundation 70. The level at which the soleplate 50 is to be imbedded (normally, at as close as possible to the level of similar sole plates at other support points for the machine 75) is established by screwing the left bolts 62 upward or downward as necessary. When this level has been established, a grout 80, conventionally of the epoxy plastic type, is poured, causing it to flow beneath the soleplate and up its sides, above the level of the ribs 57, and embed the soleplate to a level somewhat below its upper surface 54.

The chock assembly 20, whose width is narrower than the spacing between the lift bolts 62, is then installed on the sole plate upper surface 54 with the slot 32 of each chock half 24, 26 accommodating the sheathed anchor bolt 74. Initially, shims 40 totalling about 0.030" in thickness, are assembled between the chock halves 24, 26.

To level the machine 75 more perfectly at each support point, the chock 20 assembly may be removed so that its thickness may be increased or lessened by securing the requisite number of steel shims 40 between the upper and lower chock halves 24, 26.

To remove the chock assembly 20 without the use of supplementary screw jacks under the machine base 76, it is lifted by turning the lift bolts 62 upward to and beyond the phantom line position of FIG. 1, as hereinabove described. After insertion within, or removal from, the chock halves of that number of shims to bring the assembly to the thickness required for precise leveling, the chock assembly 20 is inserted between the grouted-in soleplate 50 and the machine base flange 76, and the lift bolts lowered out of contact therewith.

In selecting plastic material for the chock halves 24, 26, consideration must be given to the effectiveness of the material as a heat barrier and how well it withstands high temperatures. High temperatures transmitted from the machine base to the grout 80 and concrete foundation 70 can bring about their gradual deterioration. A typical result would be loss of the bond of the sole plate to the grout; vibrations exerted by the sole plate 50 would be likely to cause the grout to disintegrate. Another criterion, therefore, is that the chock material should have such resiliency and damping qualities as to lessen the delivery of vibrations to the sole plate. Further, the chock material should undergo no appreciable "creep" or flow under the temperature and the compressive loads applied by the machinery; otherwise re-leveling might be required on passage of time.

One material found to be highly advantageous for this application is denominated HST-II, manufactured by Haysite Reinforced Plastics, Erie, Pa. HST-II is a thermo-setting polyester reinforced by fiberglass mat and is recognized by Underwriters Laboratories as being able, when under stress of mechanical loads, to withstand temperatures up to 210° C. before degrading. It is characterized by a thermal conductivity of 2.0 BTU/hr. ft.$^2$/in./°F., a flexural strength of 25,000 psi, an elastic modulus in flexture of $1.7 \times 10^6$, a specific gravity of 1.62, and a compressive strength at ordinary ambient temperature of 33,000 psi (as determined by ASTM test method D-695). It will be understood that such compressive strength is lessened somewhat at temperatures higher than room temperature, but will not be severely impaired at machine operating temperatures, say 140-160 degrees F. While no accurate measurement of its resiliency and damping characteristics at such operating temperatures is available, HST-II has been demonstrated to be far superior in these respects to the rigid steel chock halves of the prior art. The suitability of other plastic materials for the purposes hereof may be determined empirically, based on the criteria herein set forth.

The HST-II plastic material has such flexibility as to provide a degree of cushioning to lessen the transmission of vibrations of the machinery to the grout and concrete foundations. Further, in contrast to the use of steel chocks, such vibratory loads do not cause fretting of the surfaces of the machine base flanges.

The specific design of the present chocks—two halves of substantially equal thickness separated by steel shims—may yield better vibration-minimizing characteristics than an all-plastic chock. It is suggested that the steel shims may spread the vibrating shear loads throughout the cross-section of the material. In any event, the steel shims, regardless how many are used at any support point, afford uniformity of cushioning, as now to be explained.

The concrete and grout foundations for such machines having multiple support points cannot, as a practical matter, be installed at precisely the same level. In the prior art, where steel shims contributed to the effective thickness of steel chocks, whatever resiliency was added to the steel chocks by the thickness of the shims would impair the uniformity, at the several support points, of the slight cushioned support of the machine afforded by the steel. In contrast, when the present substantially cushioning plastic chock halves 24, 26 are used with conventional steel shims, insertion of the slender shims 40 between the chock halves has no measurable effect on the uniformity of cushioning at the several support points. Where the chock halves are of equal thickness, each chock half has the same elastic resilience in compression as the other, and the sum of their compressive deflections is the same regardless of the number of steel shims inserted between them. Hence the insertion of varying numbers of steel shims at different support points does not disturb this uniformity of cushioning at each support point.

The present chock and sole plate assemblies have up to date of this application, preliminarily demonstrated highly favorable wear characteristics. Where with all steel chock assemblies the vibratory contact of the machine base on the upper chock half caused severe fretting, wearing away the cast iron machine base, no wear could be detected after several months using chocks of the present construction. There was minimal transfer of heat from the machine frame downward to the poured-in grout; the heat was baffled by the successively alternating layers of plastic and metal—plastic upper chock half, metal shims, plastic lower chock half, metal sole plate—all in sequence and resting on the plastic grout. Engine vibrations were evenly cushioned. Greatly improved continuity of adhesion of grout to sole plate is anticipated, to maintain its bond unbroken and thereby minimize re-grouting operations or eliminate them altogether.

In the foregoing description and the claims which follow, the chock pieces 24, 26 are denominated halves, but it is to be understood that this term does not require that they be of equal thickness, nor foreclose use of a third thickness of the plastic. Instead, the term halves is used for convenience to call for more than one piece of the same plastic material at each support point, with their total thickness at each support point being the same. The words "chock" and "shim" are used herein in their conventional meanings, "chock" or "chock half" signifying thickness of a substantially greater order of magnitude than "shim", as shown in the drawings.

As various modifications may be made in the constructions herein described and illustrated without departing from the scope of the invention, it is intended that all matter contained in the foregoing description or shown in the accompanying drawings shall be interpreted as illustrative rather than limiting.

We claim:

1. For use in supporting and adjustably leveling a heat and vibration producing machine secured by a substantially vertical anchor bolt to a foundation having a sole plate thereon, without removing such anchor bolt,
   a chock assembly including upper and lower chock halves of a plastic material characterized by substantially less heat conductivity and greater flexibility than steel and by freedom from creep in compression at the temperature and compressive loading from such machine, said chock halves having a common plan form including registering slots leading inward from an edge thereof, said slots being of such width and extent as to accommodate such anchor bolt when said chock assembly is atop such sole plate,
   each said chock half having parallel top and bottom surfaces and having aligned registering bores perpendicular thereto, said chock assembly further comprising
   one or more steel leveling shims disposed between said chock halves, each shim having a plan form substantially corresponding to the plan form of said chock halves and including a slot and bores adapted to register with said slot and bores of said chock halves the bores having means to secure said halves and shims in registration with each other,
   whereby said chock assembly minimizes deterioration of such foundation, and on relieving the load of such machine thereon, said chock assembly may be slid out from between such machine and sole plate for insertion or removal of one or more said shims between said chock halves without substantially affecting the said resiliency of their support.

2. Intermediate support members for supporting and adjustably leveling a heat and vibration producing machine secured to foundation means by a substantially vertical anchor bolt extending from the base of such machine to such foundation means, comprising the combination of
   a steel sole plate including a central portion having a flat upper surface and spaced-apart outer portions,
   at least two vertical bolts screwed through said outer portions and extending upward to bolt heads,
   said sole plate central portion having a slot, whose width is sufficient to accommodate such anchor bolt, extending inward from an edge thereof to a point substantially midway between said vertical bolts, said intermediate support members further comprising
   a chock assembly including upper and lower chock halves of a material characterized by substantially less heat conductivity and greater flexibility than steel and by freedom from creep in compression at the temperature and compressive loading from such machine, said chock halves having a common plan form whose width is narrower than the spacing between said vertical bolts and whose combined thickness is substantially less than the length of said vertical bolts, said chock halves having registering slots leading inward from an edge thereof, said slots being of such width and extent as to accommodate such anchor bolt, said chock assembly is disposed atop said central portion of said sole plate, each said chock half having parallel top and bottom surfaces and having aligned registering bores perpendicular thereto, said chock assembly further comprising one or more steel leveling shims, disposed between said chock halves each shim having a plan form substantially corresponding to the plan form of said chock halves and including a slot and bores adapted to register with said slot and bores of said chock halves the bores having means to secure said halves and shims in registration with each other, whereby on screwing said vertical bolts upward to relieve the load on said chocks, said chocks may be slid outward from between such machine and said sole plate for insertion or removal of one or more said shims between said chock halves without affecting the resiliency of their support.

3. A chock assembly as defined in claim 1, in which the thickness of each said chock half is of a greater order of magnitude than the thickness of said shims.

4. The combination defined in claim 1, wherein the plastic material of said chock halves is a thermoset polyester and glass laminate having a thermal conductivity preferably of the order of 2.0 BTU/hr. ft.$^2$/in./°F., a compressive strength preferably of the order of 33,000 psi, a flexural strength preferably of the order of 25,000 psi, and a specific gravity preferably of the order of 1.62.

5. The combination defined in claim 2, the sole plate having, at a level spacedly below its flat top surface, elongated horizontal rib or groove surfaces, whereby on pouring of grout on such foundation to a level below said sole plate top surface but above said rib or groove surface, improved adhesion to such grout is afforded to resist such vibrations as may be transferred downward to said sole plate.

6. The combination defined in claim 2, wherein the plastic material of said chock halves is a thermoset polyester and glass laminate having a thermal conductivity preferably of the order of 2.0 BTU/hr. ft.$^2$/in./°F., a compressive strength preferably of the order of 33,000 psi, a flexural strength preferably of the order of 25,000 psi, and a specific gravity preferably of the order of 1.62.

* * * * *